US008877850B2

(12) United States Patent
Kogure et al.

(10) Patent No.: US 8,877,850 B2
(45) Date of Patent: *Nov. 4, 2014

(54) LIGHT-DIFFUSING POLYCARBONATE RESIN COMPOSITION AND LIGHT-DIFFUSING PLATE

(75) Inventors: Masami Kogure, Ichihara (JP); Hiroshi Kawato, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 68 days.

This patent is subject to a terminal disclaimer.

(21) Appl. No.: 12/305,207

(22) PCT Filed: Jun. 18, 2007

(86) PCT No.: PCT/JP2007/062231
§ 371 (c)(1),
(2), (4) Date: Dec. 17, 2008

(87) PCT Pub. No.: WO2007/148652
PCT Pub. Date: Dec. 27, 2007

(65) Prior Publication Data
US 2010/0149644 A1    Jun. 17, 2010

(30) Foreign Application Priority Data

Jun. 19, 2006  (JP) ................. 2006-168865

(51) Int. Cl.
| C08K 3/40 | (2006.01) |
| G02B 5/02 | (2006.01) |
| C08K 5/10 | (2006.01) |
| C08L 69/00 | (2006.01) |
| C08K 5/00 | (2006.01) |
| C08L 83/04 | (2006.01) |
| C08K 3/36 | (2006.01) |
| C08K 5/103 | (2006.01) |
| C08L 33/12 | (2006.01) |
| C08K 7/04 | (2006.01) |
| C08K 5/20 | (2006.01) |
| C08K 7/10 | (2006.01) |
| C08K 7/14 | (2006.01) |
| C08L 33/08 | (2006.01) |

(52) U.S. Cl.
CPC .............. G02B 5/0278 (2013.01); C08K 5/10 (2013.01); C08L 83/04 (2013.01); C08L 2205/22 (2013.01); C08K 3/36 (2013.01); G02B 5/0242 (2013.01); C08K 5/103 (2013.01); C08L 33/12 (2013.01); C08K 7/04 (2013.01); C08K 5/20 (2013.01); C08L 69/00 (2013.01); C08K 7/10 (2013.01); C08K 5/005 (2013.01); C08K 7/14 (2013.01); C08L 33/08 (2013.01)
USPC ............................. 524/494; 359/599

(58) Field of Classification Search
USPC ........... 252/589; 359/599; 428/220; 524/114, 524/115, 267, 289, 414, 417, 502, 537, 539, 524/601, 611, 494; 525/190, 464
See application file for complete search history.

(56) References Cited

U.S. PATENT DOCUMENTS

| 4,396,678 A * | 8/1983 | Olson ........................... 428/412 |
| 7,674,506 B2 * | 3/2010 | Sogo et al. ..................... 428/1.1 |
| 2006/0068171 A1 * | 3/2006 | Maekawa et al. .............. 428/188 |
| 2007/0037906 A1 * | 2/2007 | Kawato et al. ................ 524/154 |
| 2007/0213452 A1 * | 9/2007 | Kawato et al. ................ 524/502 |
| 2009/0080079 A1 * | 3/2009 | Kogure et al. ................ 359/599 |
| 2009/0093583 A1 * | 4/2009 | Kawato et al. ................ 524/502 |
| 2009/0116115 A1 * | 5/2009 | Kogure et al. ................ 359/599 |
| 2009/0186208 A1 * | 7/2009 | Ishikawa et al. .............. 428/220 |

FOREIGN PATENT DOCUMENTS

| CN | 1755402 A | 4/2006 | |
| JP | 10 73725 | 3/1998 | |
| JP | 11 158364 | 6/1999 | |
| JP | 2000-318107 | 11/2000 | |
| JP | 2005259593 A * | 9/2005 | .............. C08L 69/00 |
| JP | 2005 298720 | 10/2005 | |
| JP | 2005 344006 | 12/2005 | |
| JP | 2005344006 A * | 12/2005 | .............. C08L 69/00 |
| JP | 2006 51655 | 2/2006 | |
| JP | 2006 63122 | 3/2006 | |
| JP | 2006 78954 | 3/2006 | |
| JP | 2006 83230 | 3/2006 | |
| JP | 2006-117822 A | 5/2006 | |
| JP | 2006 143949 | 6/2006 | |
| KR | 10-2002-0018670 A | 3/2002 | |
| TW | I233935 B | 6/2005 | |
| WO | WO 01/72900 A1 | 10/2001 | |
| WO | WO 2004111692 A1 * | 12/2004 | .............. G02F 1/1335 |
| WO | WO 2005035659 A1 * | 4/2005 | .............. C08L 69/00 |
| WO | WO 2005346959 A1 * | 4/2005 | .............. C08L 69/00 |
| WO | WO 2005100476 A1 * | 10/2005 | .............. C08L 69/00 |
| WO | 2006 043618 | 4/2006 | |
| WO | WO 2006043618 A1 * | 4/2006 | .............. C08L 69/00 |

OTHER PUBLICATIONS

Machine Translation of JP 2005-259593.*
Machine Translation of JP 2005-344006.*
U.S. Appl. No. 11/994,031, filed Dec. 27, 2007, Kawato, et al.
U.S. Appl. No. 11/577,723, filed Nov. 27, 2007, Kogure, et al.
Office Action issued Oct. 10, 2013 in Korean Patent Application No. 10-2009-7000978 (with English language translation).
Chinese Office Action issued Oct. 17, 2012, in China Patent Application No. 200780022353.X (with English translation).
Combined Taiwanese Office Action and Search Report issued Mar. 25, 2013, in Taiwanese Patent Application No. 096121875 with English translation and English translation of category of cited documents.
Chinese Office Action issued Feb. 22, 2012 in patent application No. 200780022353.X with English translation.

* cited by examiner

Primary Examiner — Hui Chin
(74) Attorney, Agent, or Firm — Oblon, Spivak, McClelland, Maier & Neustadt, L.L.P.

(57) ABSTRACT

A polycarbonate-base light-diffusing resin composition contains: (A) 100 parts by mass of an aromatic polycarbonate resin; (B) 0.01 to 10 parts by mass of a light diffusing agent; (C) 0.05 to 5 parts by mass of a light resistant agent, the light resistant agent being one or more light resistant agent selected from a malonate-base compound, an oxalylanilide-base compound, a benzotriazole-base compound and an acrylic resin having a side chain of a benzotriazole-base skeleton; and 0.01 to 1 parts by mass of an ester compound of fatty acid and multivalent alcohol. By molding the composition by injection molding or the like, a light diffusing plate is obtained.

17 Claims, No Drawings

LIGHT-DIFFUSING POLYCARBONATE RESIN COMPOSITION AND LIGHT-DIFFUSING PLATE

TECHNICAL FIELD

The present invention relates to a polycarbonate-base light-diffusing resin composition and a light diffusing plate molded of the resin composition.

BACKGROUND ART

In recent years, liquid crystal displays (LCD) have been put in such an expansive use as to be applied not only to monitors of notebook PCs but also to monitors of desktop PCs and home television sets. Such LCDs use so-called light diffusing plates for scattering light from backlights. For bottom-emitting-type backlights installed in, for instance, home television sets having approximately 20-inch screen size, which are particularly demanded to have higher luminance, light diffusing plates (thickness: 1 to 3 mm) made of acrylic resin have been typically used. However, acrylic resins are dimensionally less stable due to their lower heat resistance and higher hygroscopicity, so that plates made of acrylic resin may be deformed to warp when applied in apparatus of large screen size.

In view of the above, aromatic polycarbonate resins (hereinafter called as "aromatic PC resins" or simply as "PC resins"), which are more excellent than acrylic resins in heat resistance and hygroscopicity, have been used as matrix resins for light-diffusing plates, and demands for such aromatic polycarbonate resins are on increase.

In recent years, light diffusing plates have been manufactured by injection molding in place of traditional extrusion molding (e.g., patent documents 1 and 2). It is because light-diffusing plates (i.e., molding products) molded by injection molding are more excellent in dimensional accuracy and also because higher productivity of injection molding can reduce cost of outer-profile processing.

Patent Document 1: JP-A-11-158364
Patent Document 2: JP-A-10-073725

DISCLOSURE OF THE INVENTION

Problems to Be Solved by the Invention

When such light diffusing plates are used in LCDs, degradation of the light diffusing plates caused by light from cold-cathode tubes needs to be prevented. Thus, a PC resin (i.e., the material for the light-diffusing plates) indispensably needs to be added with light resistant agent(s).

On the other hand, according to traditional extrusion molding, light resistance can be imparted locally to a surface layer of a light diffusing plate by multilayering or coating the light diffusing plate. In contrast, according to injection molding, which is basically for molding a single-layer plate, enhancement of light resistance requires concentration of ultraviolet absorber(s) to be raised. In addition, in order to obtain a light diffusing plate of a large size by injection molding, a resin of enhanced fluidity needs to be used, so that addition of advanced fluidizer(s) such as a styrene-acrylic copolymer is preferable.

However, addition of such ultraviolet absorber(s) and advanced fluidizer(s) may respectively lead to deterioration of color tone of a PC resin (increase in YI, increase in chromaticity) when the PC resin is molded into molding products.

Accordingly, an object of the invention is to provide a polycarbonate-base light-diffusing resin composition that exhibits less initial coloration after being molded into molding products no matter what type of molding method is used, and to provide a light-diffusing plate molded of the composition.

Means for Solving the Problems

In order to solve such problem(s) as above, a polycarbonate-base light-diffusing resin composition according to an aspect of the invention (hereinafter referred to simply as "PC resin composition") contains: (A) 100 parts by mass of an aromatic polycarbonate resin; (B) 0.01 to 10 parts by mass of a light diffusing agent; (C) 0.05 to 10 parts by mass of a light resistant agent, the light resistant agent being one or more light resistant agent selected from a malonate-base compound, an oxalylanilide-base compound, a benzotriazole-base compound and an acrylic resin having a side chain of a benzotriazole-base skeleton; and (D) 0.01 to 1 parts by mass of an ester compound of fatty acid and multivalent alcohol.

According to the PC resin composition of the invention, since the content of the light diffusing agent is in a range of 0.01 to 10 parts by mass, molding products molded of the composition such as a light diffusing plate can exhibit favorable light diffusibility and provide sufficiently high luminance. In addition, since the content of the predetermined light resistant agent is in a range of 0.5 to 2 parts by mass, the obtained molding products can exhibit favorable light resistance and maintain its initial color tone. Further, since the content of the predetermined ester compound is in a range of 0.01 to 1 parts by mass, the molding products having been molded of the composition can exhibit less coloration no matter what type of molding method is used. Particularly, the PC resin composition according to the aspect of the invention is preferably used for manufacturing injection-molded products, which are molded with high-shear rate.

In the aspect of the invention, the (B) light diffusing agent is preferably one light diffusing agent or a combination of two or more light diffusing agents selected from cross-linked PMMA resin particles, silicone resin particles, polyorganosilsesquioxane particles, silica particles, quartz particles, silica fibers, quartz fibers and glass fibers.

According to the aspect of the invention, since the predetermined particles and the like are added as the light diffusing agent (i.e., as the component (B)), the molding products molded of this composition such as light diffusing plates can exhibit favorable light diffusibility.

The PC resin composition according to the aspect of the invention preferably further contains (E) 0.01 to 1 parts by mass of organopolysiloxane. In addition, a difference in refractive index between the component (E) and the (A) aromatic polycarbonate resin is more preferably 0.1 or less.

According to the aspect of the invention, by adding a predetermined amount of organopolysiloxane, thermal stability of the composition at the time of molding can be enhanced. Further, by setting the difference in refractive index within the above range, transparency of the obtained molding products is not reduced. In other words, reduction in light-ray transmissivity can be lessened.

The PC resin composition according to the aspect of the invention preferably further contains (F) 0.01 to 1 parts by mass of an acrylic thermoplastic resin. In addition, viscosity-average molecular weight of the acrylic thermoplastic resin is more preferably 1,000 to 200,000.

According to the aspect of the invention, by adding a predetermined amount of the acrylic resin as the component (F), light guiding characteristics of the aromatic PC resin as the component (A) can become favorable, and favorable luminance can be obtained when the compound is molded into a light diffusing plate. In addition, when the viscosity-average molecular weight is within the above range, compatibility of the component (F) with the aromatic PC resin (i.e., the compound (A)) becomes favorable.

A light diffusing plate according to another aspect of the invention is formed by molding the above-described polycarbonate-base light-diffusing resin composition.

Thus, according to the aspect of the invention, the obtained light diffusing plate can exhibit less initial coloration and more invulnerability to light degradation caused by a cold-cathode tube and the like used in a backlight.

BEST MODE FOR CARRYING OUT THE INVENTION

The component (A) for forming the polycarbonate-base light-diffusing resin composition (PC resin composition) according to the aspect of the invention is an aromatic PC resin manufacturable by reacting divalent phenol with a polycarbonate precursor such as phosgene or a carbonate ester compound. For instance, the aromatic PC resin is manufactured by reacting divalent phenol with a polycarbonate precursor such as phosgene or transesterifying divalent phenol and a polycarbonate precursor such as diphenyl carbonate, in a solvent such as methylene chloride under presence of a known acid receptor and molecular weight modifier with addition of a branching agent as needed.

While a variety of divalent phenol is usable therein, 2,2-bis(4-hydroxyphenyl) propane (typically known as bisphenol A) is particularly preferable. Examples of bisphenol other than bisphenol A are: bis(hydroxyaryl)alkanes such as bis(4-hydroxyphenyl)methane, 1,1-bis(4-hydroxyphenyl)ethane, 2,2-bis(4-hydroxyphenyl)butane, 2,2-bis(4-hydroxyphenyl)octane, 2,2-bis(4-hydroxyphenyl)phenylmethane, 2,2-bis(4-hydroxy-1-methylphenyl)propane, bis(4-hydroxyphenyl)naphthylmethane, 1,1-bis(4-hydroxy-t-butylphenyl)propane, 2,2-bis(4-hydroxy-3-bromophenyl)propane, 2,2-bis(4-hydroxy-3,5-tetramethylphenyl)propane, 2,2-bis(4-hydroxy-3-chlorophenyl)propane, 2,2-bis(4-hydroxy-3,5-tetrachlorophenyl)propane and 2,2-bis(4-hydroxy-3,5-tetrabromophenyl)propane; bis(hydroxyaryl)cycloalkanes such as 1,1-bis(4-hydroxyphenyl)cyclopentane, 1,1-bis(4-hydroxyphenyl)cyclohexane, and 1,1-bis(4-hydroxyphenyl)-3,5,5-trimethylcyclohexane; dihydroxyaryl ethers such as 4,4'-dihydroxyphenylether and 4,4"-dihydroxy-3,3"-dimethylphenylether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4"-dihydroxy-3,3'-dimethyldiphenyl sulfoxide; dihydroxydiaryl sulfones such as 4,4'-dihydroxydiphenyl sulfone and 4,4"-dihydroxy-3,3'-dimethyldiphenyl sulfone; and dihydroxydiphenyls such as 4,4'-dihydroxydiphenyl. One of the above divalent phenols may be singularly used or a mixture of two or more thereof may be used.

Examples of the carbonate ester compound are diaryl carbonate such as diphenyl carbonate and dialkyl carbonate such as dimethyl carbonate and diethyl carbonate. A variety of molecular weight modifiers typically used for polymerization of polycarbonate can be used. Specifically, examples of monovalent phenol are phenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylphenol, o-phenylphenol, m-phenylphenol, p-phenylphenol, o-n-nonylphenol, m-nonylphenol, p-n-nonylphenol, o-cumylphenol, m-cumylphenol, p-cumylphenol, o-naphthylphenol, m-naphthylphenol, p-naphthylphenol, 2,5-di-t-butylphenol, 2,4-di-t-butylphenol, 3,5-di-t-butylphenol, 2,5-dicumylphenol, 3,5-dicumylphenol, p-cresol, bromophenol and tribromophenol. Among the above monovalent phenol, p-t-butylpheno, p-cumylphenol, p-phenylphenol and the like are preferably used.

Examples of the branching agent are compounds having three or more functional groups such as 1,1,1-tris(4-hydroxyphenyl) ethane. α,α',α"-tris(4-hydroxyphenyl)-1,3,5-triisopropylbenzene, 1-[α-methyl-α-(4'-hydroxy phenyl)ethyl]-4-[α',α'-bis(4"-hydroxyphenyl)ethyl]benzene, phloroglycine, trimellitic acid and isatinbis(o-cresol).

It is preferable that a viscosity-average molecular weight of the PC resin used in the invention is typically in a range of 10,000 to 100,000. More preferably, the viscosity-average molecular weight is in a range of 15,000 to 40,000. By measuring viscosity of methylene chloride solution at 20 degrees C. with a Ubbelohde viscometer and obtaining the limiting viscosity [η] therefrom, the viscosity-average molecular weight (Mv) is derived from the following formula.

$$[\eta]=1.23\times10^{-5} Mv^{0.83}$$

In the PC resin composition according to the aspect of the invention, the light diffusing agent as the component (B) may be any light diffusing agent as long as the light diffusing agent is formed of a solid that: is optically transparent; and has refractive index different from that of the aromatic PC resin as the component (A). As the light diffusing agent, a single agent may be used, or two or more agents may be used in a combined manner. An average particle diameter of the light diffusing agent is typically in a range of approximately 1 to 100 μm, more preferably in a range of 2 to 50 μm. The light diffusing agent having an average particle diameter in a range of 1 to 100 μm is preferable because the light diffusing agent exhibits high light-ray transmissivity and favorable light diffusibility.

Examples of the light diffusing agent are cross-linked polymethylmethacrylate (cross-linked PMMA) resin particles, silicone resin particles, polyorganosilsesquioxane particles, silica particles, quartz particles, silica fibers, quartz fibers, glass fibers, silica beads, silicone resin beads and glass beads. Additional examples thereof are hollow beads, amorphous powder and plate-like powder formed of the same material(s) as above. One of the above light diffusing agents may be singularly used, or a combination of two or more thereof may be used.

In terms of transparency and refractive index, the light diffusing agent is preferably cross-linked PMMA resin particles, silicone resin particles, polyorganosilsesquioxane particles, silica particles, quartz particles, silica fibers, quartz fibers and glass fibers, particularly preferably cross-linked PMMA resin particles, silicone resin particles, polyorganosilsesquioxane particles, silica particles and quartz particles.

The content of the light diffusing agent as the component (B) is required to be in a range of 0.01 to 10 parts by mass per 100 parts by mass of the aromatic PC resin as the component (A), more preferably in a range of 0.05 to 5 parts by mass. When the content of the light diffusing agent is less than 0.01 parts by mass, the molding products molded of the PC resin composition such as PC light diffusing plate exhibits insufficient light diffusibility. On the other hand, when the content of the light diffusing agent is 10 parts by mass or more, the molding products exhibits excessive light diffusibility, which leads to deterioration of luminance.

In the PC resin composition according to the aspect of the invention, the light resistant agent as the component (C) is a single agent or a combination of two or more agents selected from a malonate-base compound, an oxalylanilide-base compound and an acrylic resin having a side chain of a benzotriazole-base skeleton.

Examples of the malonate-base compound are benzylidenebisdiethylmalonate and 4-methoxyphenyl-methylene-dimethylester. An example of the oxalylanilide-base compound is an oxalylanilide compound that has a hydrocarbon group having 1 to 12 carbon atoms. Examples of the acrylic resin having a side chain of a benzotriazole-base skeleton are compounds in which polymethylmethacrylate (PMMA) side chains are linked with 2-(5-t-octyl-2-hydroxyphenyl) benzotriazole groups. The above light resistant agent is an ultraviolet absorber of which maximum wavelength according to an ultraviolet absorption spectrum is in a range of 290 to 330 nm.

The content of the light resistant agent as the component (C) is required to be in a range of 0.05 to 10 parts by mass per 100 parts by mass of the aromatic PC resin as the component (A), more preferably in a range of 0.1 to 3 parts by mass. When the content of the light resistant agent is less than 0.05 parts by mass, sufficient light resistance cannot be obtained. In contrast, when the content is more than 10 parts by mass, more smoke is generated at the time of molding, such that the initial color tone of the molding products is deteriorated.

In the PC resin composition according to the aspect of the invention, the component (D) is an ester compound of fatty acid and multivalent alcohol.

Examples of the component (D) are ester or partial ester of fatty acid having 5 to 30 and one or more multivalent alcohol selected from glycerin, trimethylolethane, trimethylolpropane, pentaerythritol and sorbitan. The partial ester herein means ester in which at least one of hydroxyl groups in the multivalent alcohol is directly present without being esterified.

The fatty acid may be saturated or unsaturated and may be linear or branched.

Specifically, examples of the fatty acid are: saturated fatty acid such as decane acid (inclusive of all isomers), undecane acid (inclusive of all isomers), dodecane acid (inclusive of all isomers), tridecane acid (inclusive of all isomers), tetradecane acid (inclusive of all isomers), pentadecane acid (inclusive of all isomers), hexadecane acid (inclusive of all isomers), heptadecane acid (inclusive of all isomers), octadecane acid (inclusive of all isomers), nonadecane acid (inclusive of all isomers), eicosanic acid (inclusive of all isomers), heneicosanic acid (inclusive of all isomers) and docosanoic acid (inclusive of all isomers); unsaturated fatty acid such as decenoic acid (inclusive of all isomers), undecenoic acid (inclusive of all isomers), dodecenoic acid (inclusive of all isomers), tridecenoic acid (inclusive of all isomers), tetradecenoic acid (inclusive of all isomers), pentadecenoic acid (inclusive of all isomers), hexadecenoic acid (inclusive of all isomers), heptadecenoic acid (inclusive of all isomers), octadecenoic acid (inclusive of all isomers), nonadecenoic acid (inclusive of all isomers), eicosenic acid (inclusive of all isomers), heneicosenic acid (inclusive of all isomers) and docosenoic acid (inclusive of all isomers); and a mixture of the above.

In terms of compatibility with the PC resin, fatty ester of multivalent alcohol preferably includes: fatty acid having 5 to 30 carbon atoms; and multivalent alcohol having 3 to 10 carbon atoms. Examples of such fatty ester of multivalent alcohol are: glycerin ester such as glycerin monododecanoate (glycerin monolaurate), glycerin monoisolaurate, glycerin didodecanoate (glycerin dilaurate), glycerin diisolaurate, glycerin monooctadecanoate (glycerin monostearate), glycerin monoisostearate and glycerin monooctadecenoate (glycerin monooleate); trimethylolpropane ester such as trimethylolethane monododecanoate (trimethylolethane monolaurate), trimethylolpropane monododecanoate (trimethylolpropane monolaurate), trimethylolpropane monolaurate, trimethylolpropane didodecanoate (trimethylolpropane dilaurate) and trimethylolpropane diisolaurate; pentaerythritol ester such as pentaerythritol monododecanoate (pentaerythritol monolaurate), pentaerythritol monoisolaurate, pentaerythritol didodecanoate (pentaerythritol dilaurate), pentaerythritol diisolaurate, pentaerythritol tridodecanoate (pentaerythritol trilaurate) and pentaerythritol tetrastearate; sorbitan ester such as sorbitan monododecanoate (sorbitan monolaurate), sorbitan monoisolaurate, sorbitan didodecanoate (sorbitan dilaurate), sorbitan diisolaurate and sorbitan tridodecanoate (sorbitan trilaurate); and a mixture of the above. Among the above ester, glycerin monostearate and pentaerythritol tetrastearate are preferable.

The content of the ester compound as the component (D) is required to be in a range of 0.01 to 1 parts by mass per 100 parts by mass of the aromatic PC resin as the component (A), more preferably in a range of 0.05 to 0.5 parts by mass. When the content of the component (D) is less than 0.01 parts by mass, little improvement in color tone can be obtained at the time when the PC resin composition according to the aspect of the invention is molded into the molding products. On the other hand, when the content of the component (D) is more than 1 part by mass, the molding products molded thereof may be unfavorably deformed under high temperature and high humidity.

According to the PC resin composition of the invention, the molding products molded of the composition such as a light diffusing plate exhibit less initial coloration while exhibiting favorable light diffusibility, and provides sufficiently high luminance. In addition, the obtained molding products are excellent in light resistance, so that the initial color tone can be easily maintained. Further, the molding products having been molded exhibit less coloration no matter what type of molding method is used. Accordingly, the resin composition is preferably used particularly for manufacturing injection-molding products, which are molded with high-shear rate.

The PC resin composition according to the aspect of the invention is preferably added with organopolysiloxane as the component (E). By adding organopolysiloxane thereto, thermal stability of the PC resin composition according to the aspect of the invention at the time of molding can be enhanced. Particularly, by setting the difference in refractive index between the component (E) and the aromatic PC resin (i.e., the component (A)) to be 0.1 or less, transparency of the obtained molding products is not reduced. In other words, reduction in light-ray transmissivity can be lessened.

In order not to deteriorate the transparency and the initial color tone when the PC resin composition is molded into the molding products, preferable examples of organopolysiloxane are organopolysiloxane having a phenyl group, a diphenyl group, a vinyl group or an alkoxy group (e.g., a methoxy group, an ethoxy group, an n-propoxy group, an isopropoxy group, an n-butoxy group, an isobutoxy group, a sec-butoxy group, a tert-butoxy group, various pentoxy groups, various heptoxy groups and various octoxy groups), organopolysiloxane having a phenyl group and a diphenyl group, organopolysiloxane having a vinyl group and an alkoxy group and organopolysiloxane having a phenyl group, an alkoxy group and a vinyl group. Organopolysiloxane is more preferably organopolysiloxane having a phenyl group, a methoxy group and a vinyl group.

The content of organopolysiloxane as the component (E) is required to be in a range of 0.01 to 3 parts by mass per 100 parts by mass of the aromatic PC resin as the component (A), more preferably in a range of 0.02 to 1 parts by mass. When the content is less than 0.01 parts by mass, thermal stability of the composition at the time of molding may be deteriorated. When the content is more than 3 parts by mass, a balance between effects and economy may be reduced.

In order to enhance light guiding characteristics, the PC resin composition according to the aspect of the invention is preferably added with an acrylic resin as the component (F). Viscosity-average molecular weight of the acrylic resin is more preferably in a range of approximately 1,000 to 200,000. When the viscosity-average molecular weight is within the above range, compatibility of the component (F) with the aromatic PC resin (i.e., the compound (A)) becomes favorable. The viscosity-average molecular weight is a value measured in accordance with the above-described method.

The acrylic resin used in the invention is a resin (polymer) having a repeat unit selected from an acrylic acid monomer unit, an acrylic ester monomer unit, an acrylonitrile monomer unit and its derivative monomer unit. The acrylic resin may be a homopolymer, a copolymer having two or more of the above units or a copolymer including styrene, butadiene and the like. Specifically, examples of the acrylic resin are polyacrylic acid, polymethylmethacrylate (PMMA), polyacrylonitrile, ethyl acrylate-acrylic acid-2-chloroethyl copolymer, acrylic acid-n-butyl-acrylonitrile copolymer, acrylonitrile-styrene copolymer, acrylonitrile-butadiene copolymer and acrylonitrile-butadiene-styrene copolymer. Particularly among the above, polymethylmethacrylate (PMMA) may be preferably used.

The polymethylmethacrylate (PMMA) may be publicly-known polymethylmethacrylate. Polymethylmethacrylate is typically manufactured by mass polymerization of methyl methacrylate monomer under presence of peroxide and azo-type polymeric initiator.

The content of the acrylic resin as the component (D) is required to be in a range of 0.01 to 1 parts by mass per 100 parts by mass of the aromatic PC resin as the component (A), more preferably in a range of 0.02 to 0.8 parts by mass. When the content of the acrylic resin is 0.01 parts by mass or more, light guiding characteristics of the base resin matrix (i.e., the aromatic PC resin as the component (A)) can be sufficiently enhanced, such that enhanced luminance can be obtained. When the content of the acrylic resin is 1 part by mass or less, phase separation of acrylic resin components is suitably conducted, and the acrylic resin is free from opaque. Accordingly, light guiding characteristics of the aromatic PC resin as the component (A) can be sufficiently enhanced, such that enhanced luminance can be obtained.

In addition to the above-described components, the PC resin composition according to the aspect of the invention may be further added with the following various resins and additives as needed.

(Styrene-Base Copolymer)

In order to enhance fluidity of the PC resin composition and residence stability, the PC resin composition is preferably added with a copolymer of styrene and an acrylic compound. For instance, by adding a copolymer of phenyl methacrylate and styrene, such objects can be attained.

An additive amount of such styrene-base copolymer is preferably in a range of 0.1 to 20 parts by mass. When the additive amount is less than 0.1 parts by mass, the fluidity is not enhanced. On the other hand, when the additive amount is more than 20 parts by mass, light-ray transmissivity of the molding products may be reduced.

(Phosphorus-Base Stabilizer)

The PC resin composition according to the aspect of the invention may be added with a phosphorus-base stabilizer selected from phosphorus-base compounds and aromatic phosphine compounds. An example of the aromatic phosphine compound is represented by the following formula.

$$P\text{—}(X)_3 \qquad (1)$$

In the formula (1) above, X represents an aryl group having 6 to 18 carbon atoms. At least one of the plurality of X may represent a substituted or unsubstituted aryl group having 6 to 8 carbon atoms.

Specifically, examples of the above are triphenylphosphine, diphenylbutylphosphine, diphenyloctadecylphosphine, tris-(p-tolyl) phosphine, tris-(p-nonylphenyl)phosphine, tris-(naphthyl)phosphine, diphenyl-(hydroxymethyl)-phosphine, diphenyl-(acetoxymethyl)-phosphine, diphenyl-(β-ethylcarboxyethyl)-phosphine, tris-(p-chlorophenyl) phosphine, tris-(p-fluorophenyl) phosphine, diphenylbenzyl phosphine, dipneyl-β-cyanoethylphosphine, diphenyl-(p-hydroxyphenyl)-phosphine, diphenyl-1,4-dihydroxyphenyl-2-phosphine and phenylnaphthylbenzylphosphine. Particularly among the above, triphenylphosphine is preferably used. One of the above arylphophine compounds may be singularly used or a mixture of two or more thereof may be used.

The content of the phosphorus-base stabilizer is preferably in a range of 0.001 to 1 parts by mass per 100 parts by mass of the aromatic PC resin as the component (A), more preferably in a range of 0.005 to 0.5 parts by mass, much more preferably in a range of 0.008 to 0.1 parts by mass. When the content is 0.001 parts by mass or more, thermal stability of the composition at the time of molding becomes favorable, such that initial yellowness (YI value) thereof is enhanced and oven-heat resistance (high-temperature aging resistance) also becomes favorable. On the other hand, when the content is 1 part by mass or less, a balance between effects and economy becomes favorable without deteriorating steam resistance.

(Alicyclic Epoxy Compound)

By adding an alicyclic epoxy compound to the PC resin composition according to the aspect of the invention, steam resistance (hydrolysis resistance) of the molding products can be enhanced. The alicyclic epoxy compound means a cyclic aliphatic compound having an alicyclic epoxy group, i.e., having an epoxy group formed by adding one oxygen atom to ethylene bond within an alicycle. Specifically, compounds represented by the following formulae (2) to (11) may be preferably used.

[Chemical Formula 1]

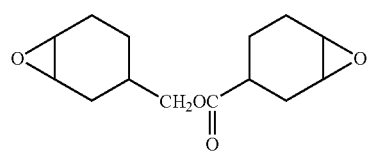

(2)

-continued

[Chemical Formula 2]

(3)

[Structure: epoxycyclohexane-CH2OC(=O)C(R)=CH2]

(R represents H or CH3)

[Chemical Formula 3]

(4)

[Structure: epoxycyclohexane-CH2OC(=O)(CH2)5OC(=O)C(R)=CH2]

(R represents H or CH3)

[Chemical Formula 4]

(5)

[Structure: epoxycyclohexane-CH=CH2]

[Chemical Formula 5]

(6)

[Structure with CO[O(CH2)5CO]aOCH2-epoxycyclohexane and CO[O(CH2)5CO]bOCH2-epoxycyclohexane]

(a + b = 1 or 2)

[Chemical Formula 6]

(7)

CH2CO[O(CH2)5CO]aOCH2-[epoxycyclohexane]
|
CH—CO[O(CH2)5CO]bOCH2-[epoxycyclohexane]
|
CH—CO[O(CH2)5CO]cOCH2-[epoxycyclohexane]
|
CH2CO[O(CH2)5CO]dOCH2-[epoxycyclohexane]

(a + b + c + d = 1 ~ 3)

[Chemical Formula 7]

(8)

[Polymer structure with three branches labeled a, b, c from R]

$(a + b + c + d = n$ (Integer),
R represents hydrocarbon group)

[Chemical Formula 8]

(9)

[Structure: epoxycyclohexane-CH2O[C(=O)(CH2)5O]nC(=O)-epoxycyclohexane]

(n represents integer, R represents hydrocarbon group)

[Chemical Formula 9]

(10)

[Structure with two R groups on epoxide rings]

(R represents hydrocarbon group)

[Chemical Formula 10]

(11)

[Polymer structure with R—O and repeating unit n]

(n represents integer,
R represents hydrocarbon group)

Among the above, the compound represented by the formula (1), (7) or (11) is excellent in compatibility with the PC resin composition. The compound is preferably used because the transparency is not impaired.

By adding such an alicyclic epoxy compound, not only hydrolysis resistance is enhanced, but also transparency of the molding products is further enhanced.

The content of the alicyclic epoxy compound is preferably in a range of 0.001 to 1.0 parts by mass per 100 parts by mass of the aromatic PC resin as the component (A), more preferably in a range of 0.01 to 0.5 parts by mass, much more preferably in a range of 0.02 to 0.2 parts by mass.

When the content is less than 0.001 parts by mass, transparency of the molding products is hardly enhanced while hydrolysis resistance is also hardly enhanced. On the other hand, when the content is more than 1.0 part by mass, phase separation may occur with more likelihood and transparency of the molding products may be reduced.

In addition to the above, the PC resin composition according to the aspect of the invention may be added with an antioxidant such as hindered phenol-base and ester-base antioxidant, a light stabilizer such as hindered amine-base light stabilizer and a typically-used agent such as a flame retardant, a retardant aiding agent, a parting agent, an antistat and a colorant.

The PC resin composition according to the aspect of the invention can be manufactured by kneading in accordance with a typically-used method. For instance, manufacturing may be conducted by a ribbon blender, a HNSCHEL-mixer™, a Bunbury mixer, a drum tumbler, a single-screw extruder, a double-screw extruder, a co-kneader, a multi-screw extruder and the like. A preferable heating temperature at the time of kneading is typically in a range of approximately 240 to 280 degrees C.

The PC resin composition according to the aspect of the invention can be molded into molding products such as a light diffusing plate by a method such as injection molding. When the resin composition is molded into a light diffusing plate, the light diffusing plate preferably has a thickness of approximately 0.5 to 2 mm so as not to be flexed or bent when built into a product.

The light diffusing plate is preferably usable in a field of liquid crystal displays, and applicable to optical components. The light diffusing plate is also usable as an alternative to glass. Examples of the optical components are optical elements such as optical lenses and light guide plate (light guide body). As an alternative to glass, the light diffusing plate is applicable to street light covers, glass laminate for vehicles and architectural materials and the like.

Example

The invention will be described in more detail below by exemplifying examples and comparatives. It should be understood that the invention is not limited thereto.

Types of components (material resins and additives) used in Examples and Comparatives are as follows.

(A) Aromatic PC Resin

With respect to the aromatic PC resin, the following experiment was conducted on two resins, namely: Tarflon FN 1500 (singularly used) detailed below as a resin (A-1); and a mixture of Tarflon FN 1500 and a polycarbonate-base copolymer (PCC1) detailed below as a resin (A-2).

(A-1) Tarflon FN 1500 [a trade name, manufactured by Idemitsu Kosan Co., Ltd. viscosity-average molecular weight of 15,000, refractive index of 1.59]

(A-2) Polycarbonate-Base Copolymer (PCC1)

PCC1 was manufactured as described below.

(Synthesis of Polytetramethylene-glycol-bis(4-hydroxybenzoate))

Under nitrogen, 100 parts by mass of polytetramethylene glycol (PTMG, Mn=2000) and 16.7 parts by mass of methyl-p-hydroxybenzoic acid were heated under presence of 0.5 parts by mass of dibutyltin oxide at 210 degrees C. Then, methanol was distilled away. Pressure within a reacting system was reduced, so that excessive p-hydroxybenzoic acid methyl ester was distilled away. After the reaction product was dissolved in methylene chloride, this methylene chloride solution was added with 8 mass % of sodium hydrogencarbonate solution and vigorously mixed together for 20 minutes. Then, a methylene chloride phase was obtained by centrifugal separation. The methylene chloride phase was condensed under reduced pressure, and polytetramethylene-glycol-bis(4-hydroxybenzoate) was obtained. By use of an HPLC, quantity of p-hydroxybenzoic acid was determined to be 10 mass ppm or less while quantity of methyl p-hydroxybenzoate was determined to be 0.2 mass %. Measurement with an HPLC was conducted in the following manner. The quantity was measured with an ODS-2 column manufactured by GL Sciences Inc., under the following conditions: a column temperature of 40 degrees C.; a mixture solvent in which 0.5-mass % phosphate aqueous solution and acetonitrile were mixed at a ratio of 1 to 2; and a flow rate of 1.0 milliliter per minute. The determinate quantity was calculated with reference to analytical curves based on standard samples.

(Manufacturing of Polycarbonate Oligomer Solution)

5.6 mass % of aqueous sodium hydroxide was added with 2000 mass ppm of sodium dithionite (the amount of sodium dithionite was per amount of bisphenol A (BPA) to be subsequently dissolved therein). Subsequently, BPA was dissolved in the aqueous sodium hydroxide so that a concentration of BPA became 13.5 mass %, through which aqueous sodium hydroxide solution of BPA was prepared. While a flow rate of the aqueous sodium hydroxide solution of BPA and a flow rate of methylene chloride were respectively set at 40 litter/hr and 15 litter/hr, phosgene was continuously let through a tube reactor having an inner diameter of 6 mm and tube length of 30 m at a flow rate of 4.0 kg/hr. The tube reactor included a jacket portion. By letting cooling water through the jacket portion, a temperature of the reaction solution was kept at 40 degrees C. or less. The reaction solution having been ejected from the tube reactor was continuously guided into a tank reactor having an inner volume of 40 litter, the tank reactor including a backswept wing and a baffle. Then, the aqueous sodium hydroxide solution of BPA (at 2.8 litter/hr), 25-mass % aqueous sodium hydroxide (at 0.07 litter/hr), water (at 17 litter/hr) and 1-mass % aqueous solution of triethylamine (at 0.64 litter/hr) were further added, so that a reaction was progressed. The reaction solution spilled out from the tank reactor was continuously taken out and rested, so that the aqueous phase thereof was eliminated by separation. Then, a methylene chloride phase was obtained. Polycarbonate oligomer obtained in the above manner had a concentration of 329 g/litter and a chloroformate-group concentration of 0.74 mol/litter.

(Manufacturing of PCC1)

15 litter of the above oligomer solution, 8.6 litter of methylene chloride, 325 g of polytetramethylene glycol-bis(4-hydroxybenzoate) in which an average molecular weight of PTMG chain was equal to 2000, and 8.5 milliliter of triethylamine were put into a 50-litter tank reactor having a baffle plate, a paddle stirring wing and a cooling jacket, and subsequently added with 2673 g of 6.4-mass % aqueous sodium hydroxide while stirring. Polycarbonate oligomer and polytetramethylene glycol-bis(4-hydroxybenzoate) were reacted for 10 minutes.

The above polymer solution was added with methylene chloride solution of p-t-butylphenol (PTBP) (i.e., solution prepared by dissolving 110 g of PTBP in 1.0 litter of methylene chloride) and aqueous sodium hydroxide solution of BPA (i.e., solution prepared by dissolving 862 g of BPA in solution prepared by dissolving 518 g of NaOH and 1.7 g of sodium dithionite in 7.6 litter of water), and was subsequently subjected to a polymerization reaction for 30 minutes. After the polymer solution was added with 15 litter of methylene chloride for dilution and stirred for 10 minutes, an organic phase containing a polycarbonate-base copolymer (PCC1) was separated from an aqueous phase containing excessive BPA and NaOH, and the organic phase was isolated therefrom.

Methylene chloride solution of thus-obtained PCC1 was cleansed sequentially with 15 vol % of 0.03 mol/litter solution of NaOH and 15 vol % of 0.2N hydrochloric acid (the amounts were per amount of the solution), and then cleansed with water repeatedly until electric conductivity of the aqueous phase having been cleansed became 0.01 μS/m. The methylene chloride solution of PCC1 obtained by cleansing was subsequently subjected to concentration and grinding, and the obtained flakes were dried at 100 degrees C. under reduced pressure. An amount of polytetramethylene glycol-bis(4-hydroxybenzoate) residue contained in the obtained PCC1, which was obtained by $^1$H-NMR, was 5.0 mass % while the viscosity-average molecular weight thereof was 14200.

(B) Light Diffusing Agent

Silicone bridge particle: KMP590 [a trade name, manufactured by Shin-Etsu Silicone Co., Ltd., average particle diameter of 2 μm]

(C) Light Resistant Agent

Malonate-base ultraviolet absorber: HOSTAVIN B-CAP [a trade name, manufactured by Clariant Corporation]

(D) Ester Compound

Monoglyceride stearate: S100A [a trade name, manufactured by Riken Vitamin Co., LTD.]

Pentaerythritol tetrastearate: EW440A [a trade name, manufactured by Riken Vitamin Co., LTD.]

(E) Organopolysiloxane

Organopolysiloxane having a phenyl group, a methoxy group and a vinyl group: KR511 [a trade name, manufactured by Shin-Etsu Chemical Co. Ltd. refractive index of 1.518]

Polyorganosiloxane having a methyl group and a phenyl group: SH556 [a trade name, manufactured by Dow Corning Toray Silicone Co. Ltd.]

(F) Acrylic Resin

Polymethylmethacrylate (PMMA): DIANAL BR-83 [a trade name, manufactured by Mitsubishi Rayon Co., Ltd., viscosity-average molecular weight of 40000]

Examples 1 to 8. Comparatives 1 to 4

After each component was mixed together in a ratio shown in Table 1, the mixture was kneaded by a single-screw kneading extruder (of which aperture diameter was 40 mmφ) under the following conditions: a temperature of 280 degrees C.; a screw rotation speed of 100 rpm; and an ejecting amount of 15 kg/hr. Then, the kneaded mixture was formed into pellets. In Table 1, part(s) by mass is a value per 100 parts by mass of the PC resin.

TABLE 1

| | (A) Aromatic PC Resin Type | (B) Light Diffusing Agent Type | Parts by mass | (C) Light Resistant Agent Type | Parts by mass | (D) Ester Type | Parts by mass | (E) Organo polysiloxane Type | Parts by mass | (F) Acrylic Resin Type | Parts by mass |
|---|---|---|---|---|---|---|---|---|---|---|---|
| Example 1 | FN1500 | KMP590 | 0.45 | HOSTAVIN B-CAP | 1.0 | S100A | 0.03 | — | — | — | — |
| Example 2 | FN1500 | KMP590 | 0.45 | HOSTAVIN B-CAP | 1.0 | S100A | 0.03 | KR511 | 0.1 | — | — |
| Example 3 | FN1500 | KMP590 | 0.45 | HOSTAVIN B-CAP | 1.0 | S100A | 0.03 | SH556 | 0.1 | — | — |
| Example 4 | FN1500 | KMP590 | 0.45 | HOSTAVIN B-CAP | 1.0 | S100A | 0.03 | KR511 | 0.1 | BR83 | 0.1 |
| Example 5 | FN1500 | KMP590 | 0.45 | HOSTAVIN B-CAP | 1.0 | EW440A | 0.03 | KR511 | 0.1 | BR83 | 0.1 |
| Example 6 | FN1500 | KMP590 | 0.45 | HOSTAVIN B-CAP | 1.0 | S100A | 0.1 | KR511 | 0.1 | — | — |
| Example 7 | FN1500 | KMP590 | 0.45 | HOSTAVIN B-CAP | 1.0 | S100A | 0.5 | KR511 | 0.1 | — | — |
| Example 8 | FN1500[1)] | KMP590 | 0.45 | HOSTAVIN B-CAP | 1.0 | S100A | 0.03 | KR511 | 0.1 | BR83 | 0.1 |
| Comparative 1 | FN1500 | KMP590 | 0.45 | HOSTAVIN B-CAP | 1.0 | — | — | — | — | — | — |
| Comparative 2 | FN1500 | KMP590 | 0.45 | HOSTAVIN B-CAP | 1.0 | S100A | 0.001 | KR511 | 0.1 | — | — |
| Comparative 3 | FN1500 | KMP590 | 0.45 | HOSTAVIN B-CAP | 1.0 | S100A | 1.5 | KR511 | 0.1 | — | — |
| Comparative 4 | FN1500 | KMP590 | 0.45 | HOSTAVIN B-CAP | 0.01 | S100A | 0.03 | KR511 | 0.1 | — | — |

[1)]A mixture formed of 70 mass % of FN1500 and 30 mass % of PCC1.

The obtained pellets were molded into 140 mm-squared and 2 mm-thick flat plates by a 100 t injection molder under the following conditions: a molding temperature of 300 degrees C.; and a tool temperature of 80 degrees C. The flat plates were used as molding products for evaluation of optical characteristics and light resistance.

In addition, 32-inch and 2 mm-thick flat plates were molded by a 650 t injection molder under the following conditions: a molding temperature of 300 degrees C.; and a tool temperature of 80 degrees C. The flat plates were used as molding products for evaluation of humidity resistance.

Subsequently, optical characteristics, light resistance and humidity resistance of the molding products were evaluated by the following methods. The results are shown in Table 2.

(Evaluation Methods)

(1) Optical Characteristics

Light-ray transmissivity, haze and YI were measured based on JIS K 7105. YI was measured under the following conditions: a measured area of 30φ; C-light source; and 2-degree field.

(2) Light Resistance

Using a light-resistance tester (manufactured by Atlas Corporation, UVCONUC-1) and using a fluorescent UV lamp as the light source, color differences ΔE exhibited by the molding products having been irradiated with light for 50 hours were measured under an atmosphere of 65 degrees C. Measurement of ΔE was based on JISK 7105.

(3) Humidity Resistance

The evaluation molding products were placed for 240 hr in a temperature/humidity-controlled tank with a temperature and humidity respectively set at 60 degrees C. and 95% RH. Then, the molding products were evaluated based on the following criteria:

Rating of "O" was given to molding products that were so free from flexure and deformation as to be usable in backlights for liquid crystal displays; and Rating of "X" was given to molding products that were flexed or deformed so much as to be unfittable into backlight chassis designed with a tolerance of ±100 μm.

TABLE 2

| | Transmissivity (%, 2 mm) | Haze (%, 2 mm) | YI (C2 Light Source) | Light Resistance (Irradiation for 50 hr) ΔE (C2 Light Source) | Humidity Resistance (32 inch) |
| --- | --- | --- | --- | --- | --- |
| Example 1 | 65 | 92 | 2.5 | 5 | O |
| Example 2 | 65 | 92 | 2.3 | 5 | O |
| Example 3 | 65 | 92 | 2.3 | 5 | O |
| Example 4 | 65 | 92 | 2.0 | 5 | O |
| Example 5 | 65 | 92 | 2.0 | 5 | O |
| Example 6 | 65 | 92 | 1.8 | 6 | O |
| Example 7 | 65 | 92 | 1.6 | 7 | O |
| Example 8 | 65 | 92 | 1.8 | 5 | O |
| Comparative 1 | 65 | 92 | 3.5 | 5 | O |
| Comparative 2 | 65 | 92 | 3.5 | 5 | O |
| Comparative 3 | 65 | 92 | 1.5 | 5 | X |
| Comparative 4 | 65 | 92 | 2.3 | 13 | O |

(Evaluation Results)

As is understood from the results shown in Table 2, since the PC resin composition prepared by adding specific additives to the PC resin in predetermined amounts was used in the Examples, the molding products of the Examples each exhibited a small degree of YI and little initial coloration. In addition, as is understood from the results of accelerated deterioration tests, the molding products of the Examples were excellent in light resistance and humidity resistance. Further, according to the Examples 6 and 7, an mount of the ester compound greatly contributes to reduction in initial coloration (YI).

In contrast, since not added with the ester compound, the Comparative 1 exhibited a large degree of initial coloration (YI). In the Comparative 2, although the ester compound was added thereto, the additive amount was so small that effective reduction in the initial coloration was not obtained. On the other hand, since added with the ester compound in an excessive amount, the Comparative 3 exhibited deterioration in humidity resistance. The Comparative 4 exhibited considerable deterioration in light resistance because the amount of the light resistant agent was small.

The invention claimed is:

1. A polycarbonate-base light-diffusing resin composition, comprising:
   (A) 100 parts by mass of an aromatic polycarbonate resin;
   (B) 0.01 to 10 parts by mass of a light diffusing agent per 100 parts by mass of the aromatic polycarbonate resin;
   (C) 0.05 to 10 parts by mass of a light resistant agent, which is a malonate-base compound, per 100 parts by mass of the aromatic polycarbonate resin; and
   (D) 0.01 to 1 parts by mass of an ester compound of a fatty acid and a multivalent alcohol per 100 parts by mass of the aromatic polycarbonate resin, and
   (E) 0.01 to 1 parts by mass of organopolysiloxane per 100 parts by mass of the aromatic polycarbonate resin.

2. The polycarbonate-base light-diffusing resin composition according to claim 1, wherein
   the (B) light diffusing agent is one light diffusing agent or a combination of two or more light diffusing agents selected from cross-linked PMMA resin particles, silicone resin particles, polyorganosilsesquioxane particles, silica particles, quartz particles, silica fibers, quartz fibers and glass fibers.

3. The polycarbonate-base light-diffusing resin composition according to claim 1, wherein a difference in refractive index between the (E) polyorganosiloxane and the (A) aromatic polycarbonate resin is 0.1 or less.

4. The polycarbonate-base light-diffusing resin composition according to claim 1, further comprising (F) 0.01 to 1 parts by mass of an acrylic thermoplastic resin per 100 parts by mass of the aromatic polycarbonate resin.

5. The polycarbonate-base light-diffusing resin composition according to claim 4, wherein viscosity-average molecular weight of the (F) acrylic thermoplastic resin is 1,000 to 200,000.

6. A light diffusing plate formed by molding the polycarbonate-base light-diffusing resin composition according to claim 2.

7. A light diffusing plate formed by molding the polycarbonate-base light-diffusing resin composition according to claim 1.

8. A light diffusing plate formed by molding the polycarbonate-base light-diffusing resin composition according to claim 3.

9. A light diffusing plate formed by molding the polycarbonate-base light-diffusing resin composition according to claim 4.

10. A light diffusing plate formed by molding the polycarbonate-base light-diffusing resin composition according to claim 5.

11. The composition of claim 1, wherein the aromatic polycarbonate resin comprises, in polymerized form, a divalent phenol.

12. The composition of claim 1, wherein the light diffusing agent (B) is comprised in an amount of from 0.05 to 5 parts by mass per 100 parts by mass of the aromatic polycarbonate resin.

13. The composition of claim 1, wherein the light resistant agent (C) is comprised in an amount of 0.1 to 3 parts by mass per 100 parts by mass of the aromatic polycarbonate resin.

14. The composition of claim 2, wherein
the (B) light diffusing agent is one light diffusing agent comprises the cross-linked PMMA resin particles.

15. The composition of claim 1, wherein the light resistant agent (C) is selected from the group consisting of benzylidenebisdiethylmalonate, 4-methoxyphenyl-methylene-dimethyl ester, and combinations thereof.

16. The composition of claim 15, wherein the light resistant agent (C) is benzylidenebisdiethylmalonate.

17. The composition of claim 15, wherein the light resistant agent (C) is 4-methoxyphenyl-methylene-dimethyl ester.

* * * * *